Figure 1:
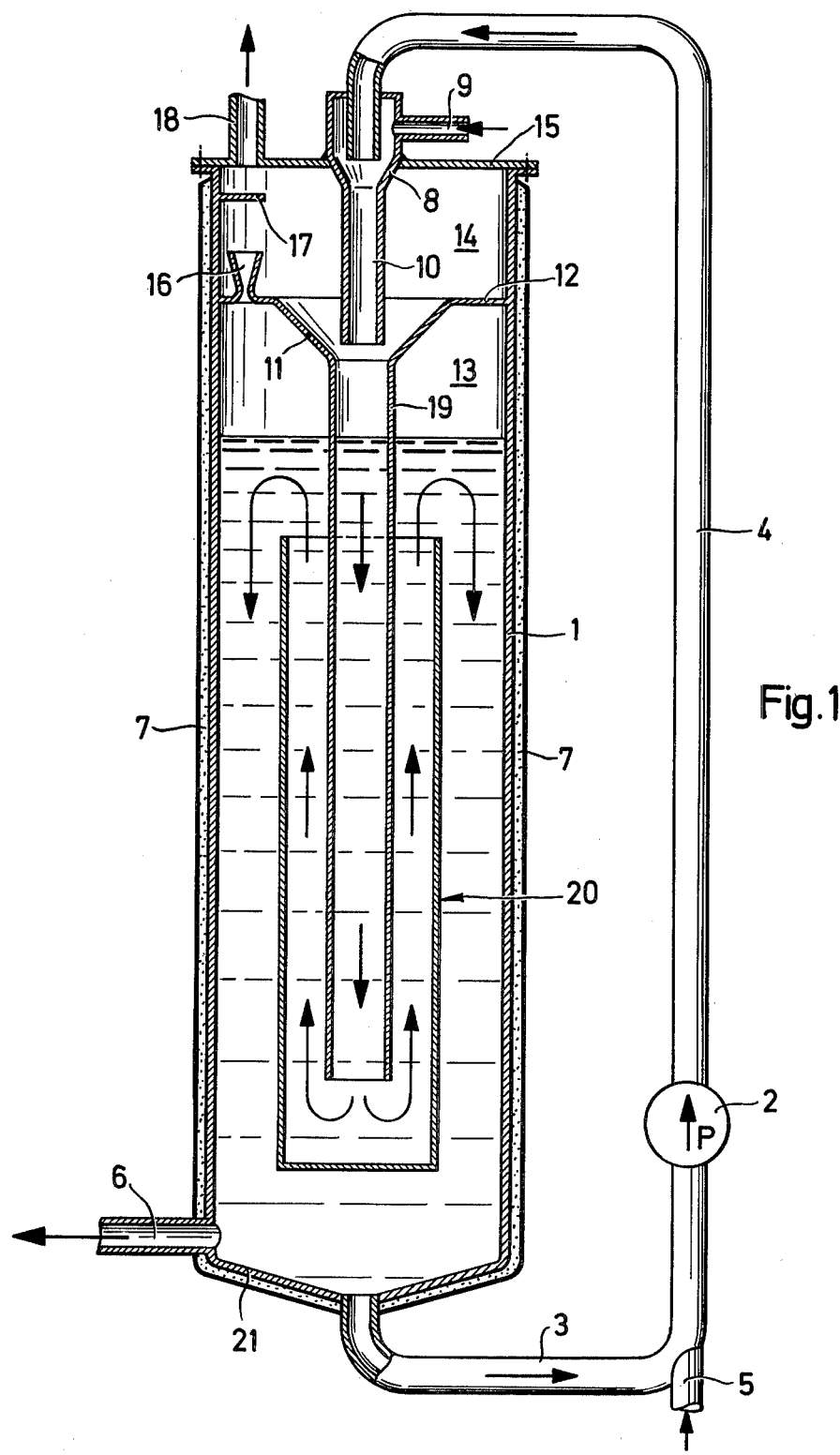

United States Patent [19]

Beurer et al.

[11] 4,100,071
[45] Jul. 11, 1978

[54] APPARATUS FOR THE TREATMENT OF LIQUIDS

[75] Inventors: Peter Beurer, Winterthur; Johannes Lüthi, Neftenbach; Libero Portaleoni, Kollbrunn, all of Switzerland

[73] Assignee: Sulzer Brothers Limited, Winterthur, Switzerland

[21] Appl. No.: 747,329

[22] Filed: Dec. 3, 1976

[30]  Foreign Application Priority Data

Dec. 10, 1975 [CH] Switzerland ..................... 16027/75

[51] Int. Cl.² .............................................. C02C 5/04
[52] U.S. Cl. ................................... 210/197; 210/218; 210/220; 55/178
[58] Field of Search ...................... 55/178; 210/14, 15, 210/59, 60, 63 R, 63 Z, 194, 195 R, 195 S, 218, 220, 221 R, 188, 197; 261/DIG. 75

[56]  References Cited
U.S. PATENT DOCUMENTS

| 1,055,210 | 3/1913 | Morison ..................... 210/221 R X |
| 1,449,114 | 3/1923 | Hayduck ............................ 55/178 |
| 1,594,947 | 8/1926 | Hartman et al. ............. 210/63 Z X |
| 2,355,564 | 8/1944 | Sebald ............................. 210/60 X |
| 2,385,522 | 9/1945 | Malott ............................. 55/178 X |
| 2,948,351 | 8/1960 | Phillips et al. ........................ 55/178 |
| 3,520,822 | 7/1970 | Traelnes ......................... 55/178 X |
| 3,696,929 | 10/1972 | Shah .............................. 210/63 R X |
| 3,936,381 | 2/1976 | Pacaud ........................... 210/220 X |

FOREIGN PATENT DOCUMENTS

| 1,499,649 | 10/1967 | France .............................. 210/14 |
| 2,242,196 | 1/1975 | Fed. Rep. of Germany. |

*Primary Examiner*—Charles N. Hart
*Assistant Examiner*—Robert H. Spitzer
*Attorney, Agent, or Firm*—Kenyon & Kenyon, Reilly, Carr & Chapin

[57]  ABSTRACT

A hydraulic conveying means, e.g. a pump, is used to create and maintain a forced through-flow of the liquid or liquid-solid mixture to be treated through a container and a forced circulation in a closed system of conduits including the container. In addition, the gas, e.g. air, is injected into the flowing liquid or liquid-solid mixture with assistance of the energy of the flowing liquid or liquid-solid mixture. The container in which mixing takes place is vertically oriented along with the delivery conduits and the gas and fine bubbled foam ejectors are concentric to the delivery conduits.

7 Claims, 3 Drawing Figures

APPARATUS FOR THE TREATMENT OF LIQUIDS

This invention relates an apparatus for the treatment of liquids. More particularly, this invention relates to an apparatus for the chemical biological treatment of liquid-solid mixtures such as sludge.

Heretofore, various types of equipment have been known for treating liquids and/or mixtures of liquids and solids by mixing a gas into the liquids or the mixtures. In some cases, a stream of the liquid or liquid-solid mixture is throughly intermixed and deflected at least once in a container filled with gases. The foam which forms in the process is then separated, at least in part, from the stream collected, broken up in a foam breaking chamber on impact plates, and fed back into the stream, at least in part, by means of an ejector. In one known apparatus of this kind (DT-AS No. 2,242,196) the circulating and intermixing of the liquid or of the mixture to be treated is performed within a treatment container by means of the energy of the gas required for the treatment process. In this case, the intensity of the circulation and the quality of the mixture thus depends on the flow and the turbulence created by the air stream. Conversely, this system does not allow an optimum adjustment of the gas stream, and especially the gas quantity, to the requirements of the treatment process. This is because it is extremely unlikely that the optimum in regards to intermixing and circulating would coincide with the values of gas quantity, gas distribution and gas velocity optimum for the treatment process.

Accordingly, it is an object of the invention to relieve the gas stream of a gas mixing treatment apparatus of the double function of intermixing and circulating.

It is another object of the invention to provide a gas mixing treatment apparatus in which the gas requirements are determined solely by the treatment process.

It is another object of the invention to assure a uniform gas distribution in a liquid being treated in a gas mixing treatment apparatus.

It is another object of the invention to provide a treatment apparatus for the chemical biological treatment of liquid-solid mixtures which is of relatively high efficiency.

Briefly, the invention provides an apparatus for the treatment of liquids and/or mixtures of liquids and solids which comprises a container defining a mixing chamber, a hydraulic conveying means for conveying a forced through-flow of the liquid or the mixture through the container, a system of conduits connected between the container and conveying means for circulating the flow therebetween, and a gas supply means for delivering a flow of gas to mix with the through-flow.

The system of conduits includes a conduit having a cross-section smaller than the cross-section of the container and the gas supply means is located in this conduit to deliver the gas thereto. In this way, the gas can be drawn into the liquid flow under a Venturi effect.

In addition, the apparatus comprises a foam breaking chamber in communication with the mixing chamber to receive a flow of foam therefrom, and at least one impact plate in the foam breaking chamber for breaking up foam bubbles impinging thereon from the mixing chamber. An ejector also communicates the foam breaking chamber with the mixing chamber to return fine bubbled foam to the mixing chamber from the foam breaking chamber.

In this apparatus, the entire energy required for maintaining the flow to be treated, for intermixing the flows and for injecting the gas is supplied by the hydraulic conveying means alone.

Since fluid flow machines generally possess higher efficiencies than volumetric compressors which may otherwise be used in other treatment apparatus, the present invention possesses the advantage of a higher efficiency. In addition, the possibility exists of adjusting the supply of gas solely in accordance with the requirements of the treatment process. An additional degree of freedom with regard to the control of the apparatus can thus be obtained because on one side, the quantity of gas, and on the other side, the stream circulated in the apparatus can serve as independent parameters for the control of the process. In addition, the apparatus allows equilibrium conditions in the heat balance to be achieved more easily.

Another advantage of the apparatus as compared to the above-discussed known apparatus consists in a considerable reduction of noise, resulting from the fact, that hydraulic machines develop significantly less noise than compressors conveying comparable quantities of gas.

Lastly, the apparatus assures fine bubbles and a uniform gas distribution in the stream to be treated.

The apparatus may be constructed to advantage in such a way, that the conduit feeding the stream to the container contains the ejector for the feedback of foam. In this case, the foam ejector is disposed in a partition of the container which separates a foam collecting chamber from the foam breaking chamber. Contrary to the known apparatus, this allows a feed back of the fine-bubbled foam by way of the total stream conveyed by forced circulation. Thus, no additional equipment units or conduits are needed for the feedback process. The effectiveness of foam destruction can be additionally improved by providing at least one foam accelerating device in the partition as well as an impact plate in spaced opposed relation to the opening of the device for breaking up the foam.

A second ejector disposed in the flow direction either before or after the first ejector can be provided to advantage for injecting the gas into the stream to be treated. Furthermore, it is advisable to provide reaction or mixing channels which extend in the flow direction and connect to each ejector in order to convey the flows at relatively high flow velocities. In this way, a particularly thorough intermixing and, as the case may be, chemical and/or biological reactions between the gases, the liquids and/or the solids, as a result of the high turbulences and intermixing activity can be obtained. Similarly, a deflecting means may be located downstream of the reaction channels for deflecting the intermixed flows.

A particularly good control of the stream can be achieved by an arrangement, in which the feed conduit, the ejector, the channels and the deflecting means are arranged vertically one above the other and concentrically with one another.

Lastly, it is also possible to cover the container and/or the apparatus itself with insulation, at least on a major part and to provide, as known, a heat exchanging device operating with a heating or cooling medium. Furthermore, the container may be open to the atmosphere, if no objectionable odors to the environment are produced, or if treatment is not to be carried out at a higher pressure. Also, the apparatus may be closed. The apparatus is suited for treatment processes carried out both continuously and intermittently. In particular, as an example of a field of use the apparatus can be used for the chemical biological treatment of liquid-solid mixtures, such as the sludge of sewage treatment plants containing up to 15% in solids.

Figure 2:
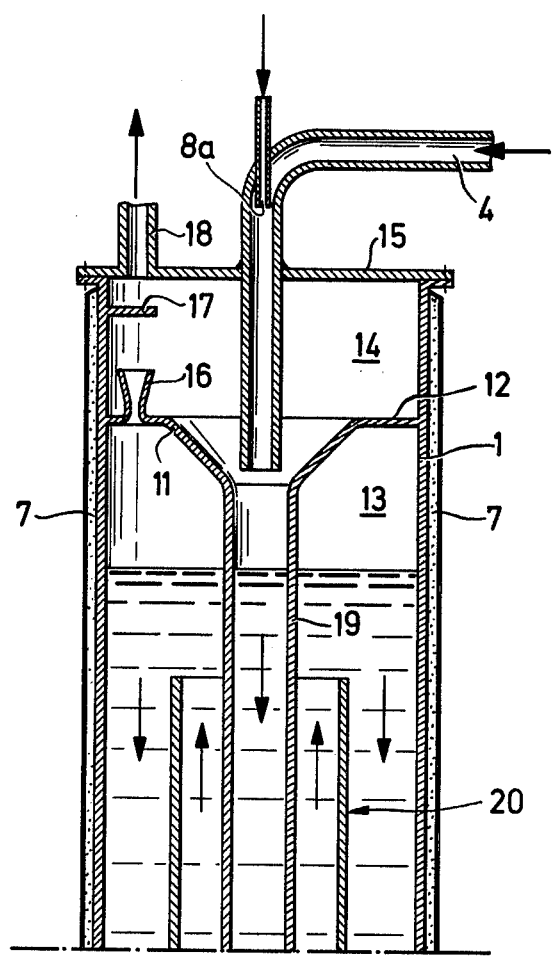
Figure 3:
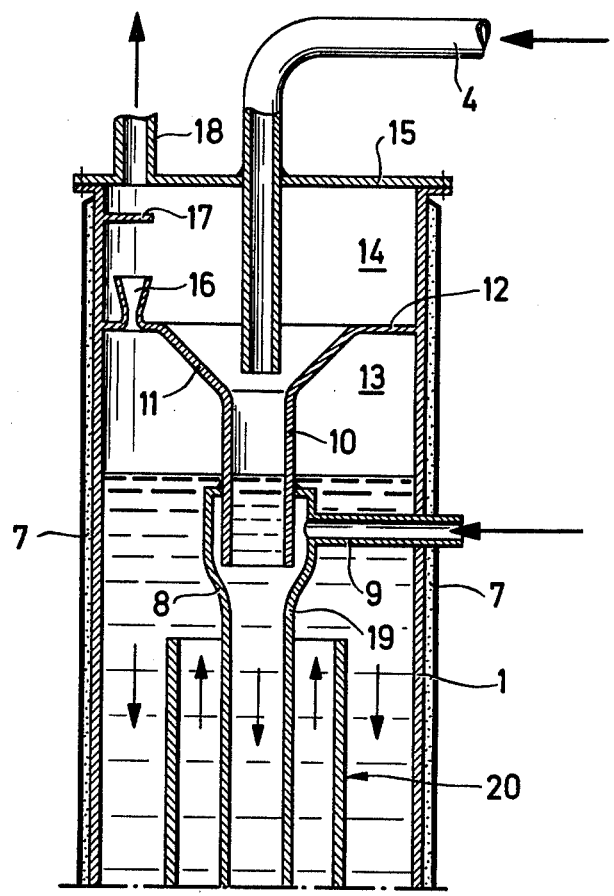

These and other objects and advantages of the invention will become more apparent from the following detailed description and appended claims taken in conjunction with the accompanying drawings in which:

FIG. 1 schematically illustrates a first embodiment of the apparatus according to the invention;

FIG. 2 illustrates a partial section of a modified apparatus according to the invention; and FIG. 3 illustrates a partial section of a further modified apparatus according to the invention.

Referring to FIG. 1, the treatment apparatus includes a vertically disposed container 1 and a hydraulic conveying means 2, e.g. a pump, for conveying a forced through-flow of a liquid and/or a mixture of liquids and solids to the container 1. In addition, the container 1 is connected by way of a system of conduits 3, 4, 10, 19 to the pump 2. As shown, one conduit 3 connects the base of the container 1 with the suction side of the pump 2 while a further conduit 4 runs from the pressure side of the pump 2 back into the container 1. A closed system is thus created, suited for the forced circulation of the stream to be treated. In case of continuously operating treatments, the fresh goods to be treated may be fed to the system by way of an inlet connection 5 to the conduit 3, and a partial quantity, which has circulated long enough to have been sufficiently treated, may be discharged by way of an outlet connection 6 from the container 1.

As shown in FIG. 1, the container 1 is open at the top and defines a mixing chamber to receive the delivered stream. The container 1 is also surrounded by insulation 7 or by a heat exchanging device (not shown) and is closed at the top by a cover 15. The feed conduit 4 terminates in an ejector 8 which is mounted in the cover 15 and which extends upwardly as a continuation of the conduit 10 in the container 1. As shown, the ejector 8 is concentric to the feed conduit 4 and is connected to a line 9 of a gas supply means which delivers a flow of gas to mix with the forced flow delivered by the feed conduit 4. The conduit 10 serves as a reaction or mixing channel in which the gas and forced flow are intermixed. This channel 10 terminates in a second ejector 11 which is disposed in a partition 12 of the container separating a foam collecting chamber 13 within the mixing chamber from a foam breaking chamber 14. The ejector 11 is concentric to the conduits 10, 19 and serves to return fine bubbled foam from the foam breaking chamber 14 into the stream to be treated. At least one foam accelerating device 16 is provided in the partition 12 adjacent to the ejector 11 to communicate the collecting chamber 13 with the foam breaking chamber 14. This device 16 is shown as an expansion nozzle, but could just as well be a simple orifice. A means in the form of an impact plate 17 for breaking up the foam bubbles is disposed in spaced opposed relation to the nozzle 16. The gas escaping within the foam breaking chamber 14 from the foam can leave the container 1 by way of a connection 18 provided in the cover 15.

The conduit 19 also serves as a reaction channel and connects to the ejector 11 below the conduit 10 to receive the stream coming from the conduit 10 and the foam from the foam breaking chamber 14. As such, the conduit 19 serves the purpose of further intermixing the stream, which at this stage consists of gas, foam and the substance to be treated and is subject to chemical or biological reactions.

A deflecting means 20 in the form of a receptacle in the shape of a cup is disposed concentrically about the channel 19 and serves to deflect the stream passing out of the conduit 19. As indicated, the stream rises upwardly between the conduit 19 and deflecting means 20 to flow over the edge of the deflecting means 20 and change direction once more. This downward stream is collected in a slightly funnel-like bottom 21 of the container 1 and is fed to the conduit 3 and, as the case may be, in part to the discharge conduit 6. The stream flowing through the conduit 3 is sucked in by the pump 2 and serves as a means of transportation for the fresh goods to be treated which are fed in by way of the inlet connection 5.

Referring to FIG. 2, wherein like reference characters indicate like parts as above, the apparatus may be modified so that the gas is introduced directly into the feed conduit 4 before passage into the container. To this end, the feed conduit 4 extends through the cover 15 to a point upstream of the reaction chamber 19 and the ejector 8 (FIG. 1) is replaced by a simple gas feeding conduit 8a. This gas feeding conduit 8a extends into the feed conduit 4 and serves to introduce gas into the stream under slight pressure, which pressure must only be as high as the pressure prevailing in the stream to be treated at the mouth of the conduit 8a.

Referring to FIG. 3, wherein like reference characters indicate like parts as above, the apparatus may also be modified so that the gas is introduced into a conduit within the container 1. To this end, as viewed in the flow direction, the ejectors 8 and 11 are interchanged.

In the various embodiments, the stream force-circulated by the pump 2 acts as a driving jet for the injection of gas and possesses velocities which are relatively low in comparison with corresponding velocities of the known systems and preferably lower than 10 meters per second (m/sec). In addition, the ratio of the quantity of gas to quantity of stream may also be relatively low and lie between 0.1 and 0.2.

During use, a first mixing in of gases, e.g. of air, into the stream takes place in the mixing channel 10 disposed after the ejector 8 (FIG. 1). The reaction channel 19 located after the second ejector 11 has a cross-section dimensioned in dependence of the stream to be carried and is of a length such that sufficient turbulence is obtained along with a stream velocity which is sufficient for mixing the fine-bubbled foam into the stream and for finely distributing the gas and the foam within the stream. The resulting downwardly directed flow velocity turns out greater than the ascending velocity of fine gas bubbles in an actual mixture of similar composition.

The section of the apparatus carrying an ascending stream is subject to lower velocities due to its larger cross-section, so that the stream quiets down and a partial separation of gases and liquid takes place. This continues within the downward flow at the outer zone of the container 1. The velocity in this outermost partial section of forced through-flow through the container 1 is so small, that a large part of the gas bubbles present in the stream can move upward.

The formation of foam is an unavoidable and undesirable effect occuring in most of the treatment processes performed in systems of this kind. As in the previously discussed known apparatus, the foam collects in the collecting chamber 13 of the container 1 above the surface of the liquids. From here, the foam is conveyed through the nozzle 16 into the foam breaking chamber 14, while being subjected to acceleration and subsequent expansion. The shearing force arising as a result of this acceleration and the created turbulence destroy a large part particularly of the larger foam bubbles, while an additional breaking up of bubbles takes place at the impact plate 7. The gases freed in this process escape by way of the conduit 18, whereas the liquid remaining behind, together with the remaining fine-bubbled foam, flows toward the ejector 11 and is fed back into the stream.

Although the process of foam destruction, as described above, is based on the same principle as that occurring in the known apparatus, the process is nevertheless considerably improved in its effectiveness by the application of the acceleration device 16. In comparison with conventional foam destroying devices, the acceleration device 16 displays the additional advantages of very low energy consumption; simple construction; and no servicing as there are no parts subject to wear, no control devices and no additional chemical defoaming agents that could adversely affect the treatment taking place in the apparatus.

It is understood, that the invention is not limited to the examples described. In particular, the container 1 and the pats carrying the stream could be disposed horizontally and be subjected to horizontal flow. Furthermore, it is possible to replace the pump 2 by a different conveying means or, in the case of continuous operation, to place the inlet and outlet connections for parts of the stream at other locations in the circuit. Lastly, it is possible to achieve conveyance of the stream in the container, e.g. the stream deflection, by alternate means.

What is claimed is:

1. An apparatus for the treatment of liquids and/or mixtures of liquids and solids, said apparatus comprising
   a container defining a mixing chamber;
   a hydraulic conveying means for conveying a forced through-flow of a liquid and/or a mixture of liquids and solids through said container;
   a system of conduits connected between said container and hydraulic conveying means to define a closed circuit for circulating the flow therebetween, one of said conduits having a cross-section smaller than the cross section of said container;
   a gas supply means located in said one conduit for delivering a flow of gas thereto to mix with said through-flow;
   a foam collecting chamber in said mixing chamber;
   a foam breaking chamber in communication with said foam collecting chamber to receive a flow of foam therefrom;
   a partition separating said foam breaking chamber from said foam collecting chamber;
   at least one impact plate in said foam breaking chamber for breaking up foam bubles impinging thereon from said mixing chamber;
   an ejector communicating said foam breaking chamber with said mixing chamber to return fine bubbled foam to said mixing chamber from said foam breaking chamber;
   at least one conduit of said system of conduits being disposed within said container for feeding the mixed flows of liquid and gas into said mixing chamber with said ejector communicating with said one conduit to deliver fine bubbled foam thereto; and
   at least one foam accelerating device in said partition in spaced opposition to a respective impact plate.

2. An apparatus as set forth in claim 1 wherein said latter conduit forms a reaction channel downstream of said ejector for intermixing the flows of liquid, gas and fine bubbled foam, and a deflecting means downstream of said reaction channel for deflecting the intermixed flows.

3. An apparatus as set forth in claim 1 wherein said gas supply means includes a second ejector communicating with said system of conduits upstream of said first ejector.

4. An apparatus as set forth in claim 3 wherein said system of conduits includes a second conduit within said container upstream of said latter conduit in communication with said second ejector to form a reaction channel for mixing of the flows of liquids and gas therein, and wherein said latter conduit forms a second reaction channel for mixing of the flows of liquid, gas and fine bubbled foam therein.

5. An apparatus as set forth in claim 1 wherein said gas supply means includes a second ejector communicating with said system of conduits downstream of said first ejector.

6. An apparatus as set forth in claim 1 wherein said container is vertical and said ejector is concentrically disposed relative to said latter conduit.

7. An apparatus as set forth in claim 1 wherein said container is insulated.

* * * * *

UNITED STATES PATENT AND TRADEMARK OFFICE
CERTIFICATE OF CORRECTION

PATENT NO. : 4,100,071
DATED : July 11, 1978
INVENTOR(S) : Peter Beurer et al

It is certified that error appears in the above-identified patent and that said Letters Patent are hereby corrected as shown below:

Column 1, line 4, after "relates" insert --to--

Column 5, line 29, change "pats" to --parts--

Signed and Sealed this

Third Day of April 1979

[SEAL]

Attest:

RUTH C. MASON
Attesting Officer

DONALD W. BANNER
Commissioner of Patents and Trademarks